United States Patent [19]
Beavin et al.

[11] Patent Number: 6,038,569
[45] Date of Patent: Mar. 14, 2000

[54] SYSTEM FOR DATA STRUCTURE LOADING WITH CONCURRENT IMAGE COPY

[75] Inventors: Thomas Abel Beavin, Milpitas; John Marland Garth, Gilroy; Laura Michiko Kunioka-Weis, Morgan Hill; James Zu-Chia Teng, San Jose, all of Calif.

[73] Assignee: International Business Machines Corporation, Armonk, N.Y.

[21] Appl. No.: 08/798,532

[22] Filed: Feb. 10, 1997

[51] Int. Cl.⁷ .................................................. G06F 17/30
[52] U.S. Cl. ............................ 707/203; 707/102; 707/7; 707/104
[58] Field of Search ..................................... 707/200, 201, 707/202, 203, 8, 204, 7, 101, 2, 102, 104

[56] References Cited

U.S. PATENT DOCUMENTS

| | | | |
|---|---|---|---|
| 5,317,731 | 5/1994 | Dias et al. | 707/203 |
| 5,440,727 | 8/1995 | Bhide et al. | 395/444 |
| 5,515,502 | 5/1996 | Wood | 395/182.13 |
| 5,553,279 | 9/1996 | Goldring | 707/203 |
| 5,581,750 | 12/1996 | Haderle et al. | 707/202 |
| 5,687,369 | 11/1997 | Li | 707/204 |
| 5,701,480 | 12/1997 | Raz | 709/101 |
| 5,721,915 | 2/1998 | Sockut et al. | 707/200 |
| 5,832,515 | 11/1998 | Ledain et al. | 707/202 |
| 5,842,208 | 11/1998 | Blank et al. | 707/7 |
| 5,873,091 | 2/1999 | Garth et al. | 707/102 |
| 5,890,166 | 3/1999 | Eisenberg et al. | 707/203 |
| 5,940,819 | 8/1999 | Beavin et al. | 707/2 |

*Primary Examiner*—Thomas G. Black
*Assistant Examiner*—Charles L. Rones
*Attorney, Agent, or Firm*—Gray Cary Ware Freidenrich

[57] ABSTRACT

Data is loaded to a data structure while an image copy of the data structure is concurrently formed. After data records are obtained from one or more data sources, each of the data records is associated with one of multiple pages. As each page is completed, it is written to a primary data structure. Also upon completion of each page in the primary data structure, concurrently with storage of the page in the primary data structure, an image copy of the page is made in an image copy data set. Partially or completely failed primary data structures may also be restored using image copies made according to the invention. Timestamps mark the time at which each page are made; image copy pages include the same timestamp as their respective primary pages. Upon detecting a data structure failure, each page of the image copy is sequentially reviewed. For each image page being reviewed, the page's timestamp is compared with the timestamp of the corresponding page from the primary data structure. The page is copied from the image copy to the primary data structure only if the timestamp comparison indicates that the image page is more recent than the page from the primary data structure.

69 Claims, 4 Drawing Sheets

SYSTEM FOR DATA STRUCTURE LOADING WITH CONCURRENT IMAGE COPY

BACKGROUND OF THE INVENTION

1. Field of the Invention

The present invention relates to the use of database tables in computers. More particularly, the invention concerns an apparatus, article of manufacture, and process for loading or reorganizing a data structure and concurrently forming a full or incremental image copy ("backup copy") of the data structure. Such data structures may comprise, for example, tables and/or indices. The invention also facilitates recovery of lost or damaged data structures from full or incremental image copies.

2. Description of Related Art

Database applications constitute one of the most popular applications of computers today. Engineers have designed may different systems and programs to store, query, and modify information stored in database tables. Intricate manipulation of table data is performed using a database language such as "SQL". Higher level operations are typically achieved by executing various high level database commands, in a database system language, such as the "DB2" product of International Business Machines Corp. Some of these high level operations include "Load " and "Image Copy" operations, for example.

Typically, a database management system performs a "Load" operation to compile data from various sources, and ultimately assemble the data into a new or existing table. An "Image Copy" operation creates a backup copy (an "image copy") of a loaded table. In systems such as DB2™ systems, an Image Copy operation is typically performed immediately after a table is loaded to create an image copy of a table. This Image Copy operation serves a number of functions, which aid in reconstruction of the table. First, if the Load operation leaded data into an existing table without separately storing ("logging") the changes, a copy of the updated table is the only way to recover the updated table. Second, even if the Load operation logged changes to the table, having the copy of the updates table helps reduce the time needed for recovering the loaded table. In particular, the table may be recovered by performing the logged updates to the previous version of the table. Accordingly, the Image Copy operation is extremely useful in modern database systems.

The Image Copy operation works by making a second "pass" over the table data, the first pass being performed when the underlining data is initially located, sorted, and assembled by the Load operation itself. In the second pass, the database manager reviews the loaded table, copying each page of the completed table to the image copy. Thus, as shown in Table 1, pages of the table are copied in order from the beginning of the table to its end, each page being copied only once. The image copy is therefore structured as shown in Table 1, below.

TABLE 1

| Conventional Image Copy |
|---|
| page 1 |
| page 2 |
| page 3 |
| page 4 |
| page 5 |

TABLE 1-continued

| Conventional Image Copy |
|---|
| . . . |

Known Load operations wait until completion of the Load to perform an Image Copy operation, delaying the user' ability to update the data until temporarily delaying availability of the data to the user until completion of the Image Copy operation. This protects the data, preventing user access to the table until an image copy has been made. Although this arrangement has proven satisfactory in many applications, some applications may require faster access to data of loaded tables. As mentioned above, creating an image copy of the loaded table requires a second pass of the table. For some users, then, waiting until the Load and Image Copy complete may simply take too long.

SUMMARY OF THE INVENTION

Broadly, he present invention concerns the loading or reorganizing of a data structure concurrently with forming an image copy of the data structure. The invention also facilitates recovery of lost or damaged data structures from image copies.

As a more specific example, the invention may be implemented to provide a method of forming or reorganizing a primary data structure in a primary database while concurrently creating a image copy of the primary data structure. The primary data structure is formed by first obtaining data records from one or more source locations. Then, each of the data records is associated with one of multiple pages. Finally, the data records are written page-by-page to the primary data structure to complete the data structure. Concurrently with storage of each page, the page is copied to an image copy data set.

This method may also include further steps to restore a partially or completely failed data structure using the image copy data set. This method uses timestamps provided by the primary and image copy pages. Namely, when a page is written to the primary data structure, it is provided with a timestamp representing the time of writing the page to the primary data structure. Image copy pages include the same timestamp as their respective primary pages. When recovering from a data structure failure, each page of the image copy is sequentially reviewed. For each image page being reviewed, the page's timestamp is compared with the timestamp of the corresponding page from the primary data structure. The page is copied from the image copy data set to the primary data structure only if the timestamp comparison indicates that the image copy is more recent than the primary table page.

In addition to the method described above, the invention may be implemented to provide an apparatus for data structure loading/copying or restoration. In still another embodiment, the invention may be implemented to provide an article of manufacture comprising a data storage device tangibly embodying a program of machine-readable instructions executable by a digital data processing apparatus to perform method steps for data structure loading/copying or restoration.

The invention affords its users with a number of distinct advantages. Importantly, the invention enhances data integrity by proving an image copy of a data structure during loading of the data structure. Thus, the image copy is available in case the loaded data structure later fails. Unlike prior arrangements, the invention creates pages of the image copy concurrently with writing of data structure pages. Consequently, the image copy of the invention is conducted more quickly, since its creation is effectively transparent to the user.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Hardware Components & Interconnections

Figure 1:
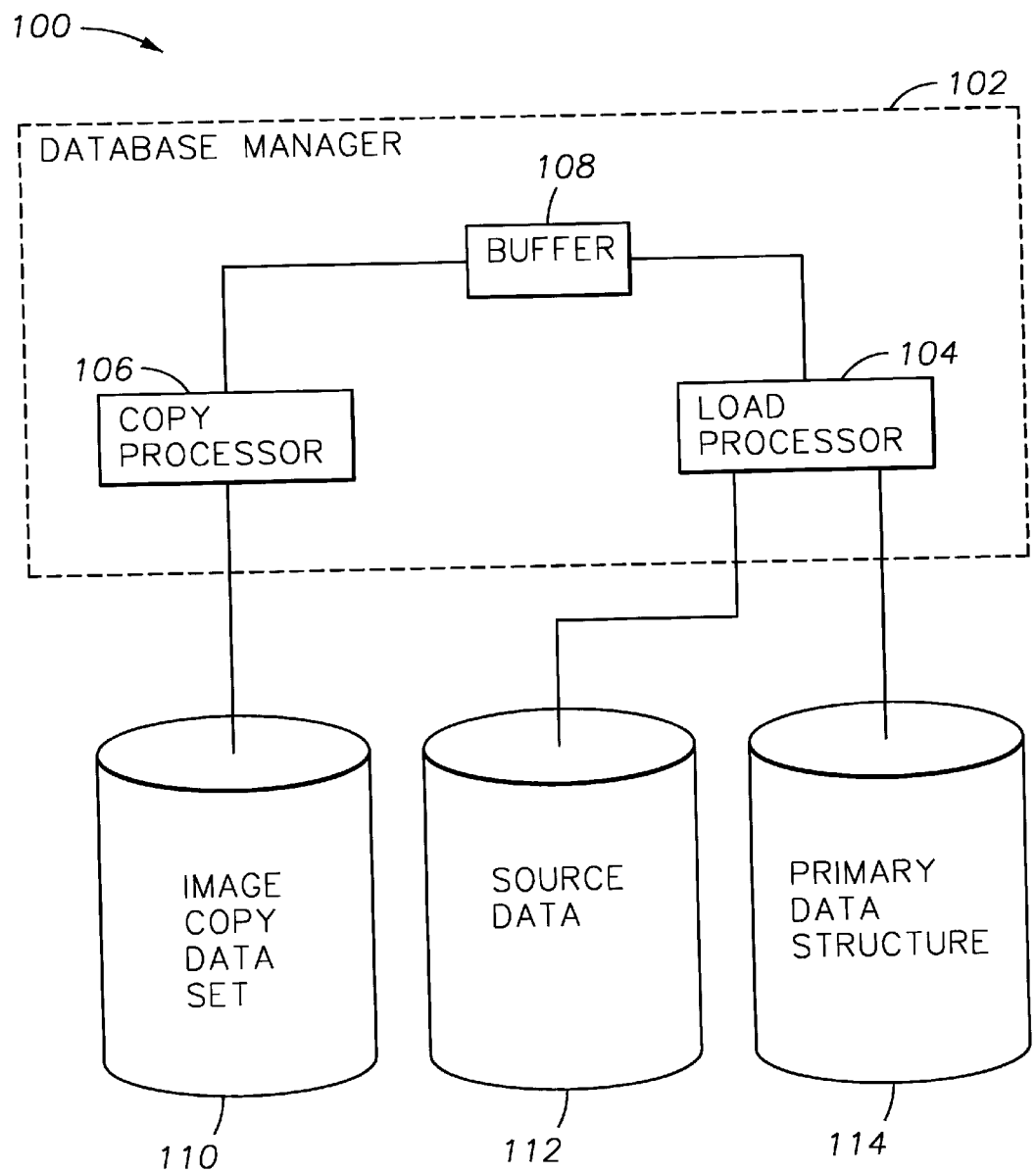
FIG. 1 is a block diagram of a system exemplifying hardware components and interconnections pursuant to the invention.

One aspect of the invention concerns a database management system 100, which may be embodied by various hardware components and interconnections as described in FIG. 1. The system 100 includes a database manager 102, and a number of different data items. In the illustrated example, the items of data include an image copy (or "backup copy") data set 110, source data 112, and a primary data structure 114. However, it should be apparent to ordinarily skilled artisans (having the benefit of the disclosure) that one or more of the data items may reside on a single device, or may be dispersed among multiple different devices.

The database manager 102 includes one or more processing units, such as a load processor 104 and a copy processor 106. As an example of another alternative, a single multitasking processor may be used. The processors 104/106 are interconnected by a buffer 108. The load processor 104 is coupled to the source data 112 and primary data structure 114, for the purpose of obtaining raw data records, assembling the data records, and ultimately storing the data records in the primary data structure 114. The copy processor 106 is coupled to the image copy data set 110, for storage of an image copy of the data structure created by the load processor 104.

As an example, the database manager 102 may be provided by a multiprocessing system such as an IBM™ System 390 model 9672 mainframe computer, where each processor 104/106 comprises a central processing unit (CPU) of the System 390 computer, and the buffer 108 is a RAM buffer. The database manager 102 may utilize an operating system such as IBM MVS™, for example. The data items 110/112/114 may be provided by a variety of different storage devices, such as magnetic disk drive ("hard drive"), magnetic or optical tape storage, etc. The data items 110/112/114 may be consolidates on separate data storage devices (as illustrated), distributed among multiple devices, consolidated on a common device, or another suitable alternative.

The operation of the foregoing components is discussed in greater detail below.

Operation

In addition to the various hardware embodiments described above, a different aspect of the invention concerns a method for loading and currently making an image copy of a data structure, and a method for restoring a failed data structure from the image copy. Such a method may be implemented, for example, by operating the system 100 to execute a sequence of machine-readable instructions.

Data Storage Device

These instructions may reside in various types of data storage medium. In this respect, one aspect of the present invention concerns an article of manufacture, comprising a data storage medium tangible embodying a program of machine-readable instructions executable by a digital data processor to perform method steps to perform operations such as loading, copying, and restoration of a data structure.

Figure 2:
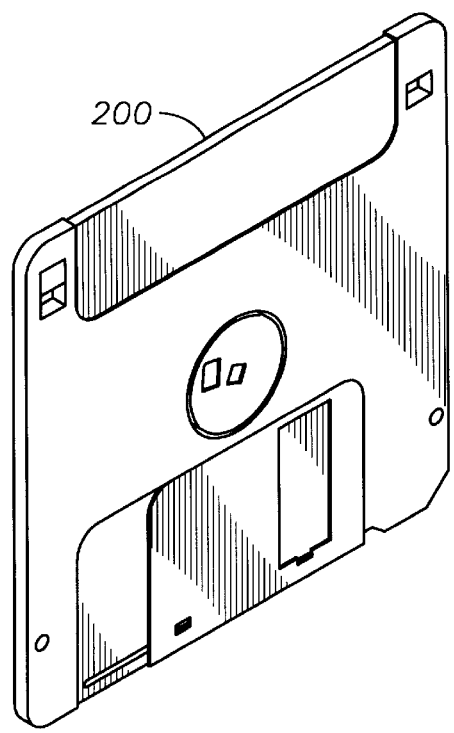
FIG. 2 is a perspective view showing one example of an article of manufacture pursuant to the invention.

This data storage medium may reside, for example, in a RAM program storage buffer (not shown) contained in the database manager 102. Alternatively, the instructions may be contained in another data storage medium, such as a magnetic data storage diskette 200 (FIG. 2). Whether contained in the database manager 102 or elsewhere, the instructions may instead be stored on another type of data storage medium such as hard drive storage (e.g., conventional magnetic disk or RAID array), magnetic tape, electronic read-only memory (e.g. ROM), optical storage device (e.g. WORM), paper "punch " cards, or other data storage medium. In an illustrative embodiment of the invention, the machine-readable instructions may comprise lines of compiled DB2™ language code.

Load/Image Copy

Figure 3:
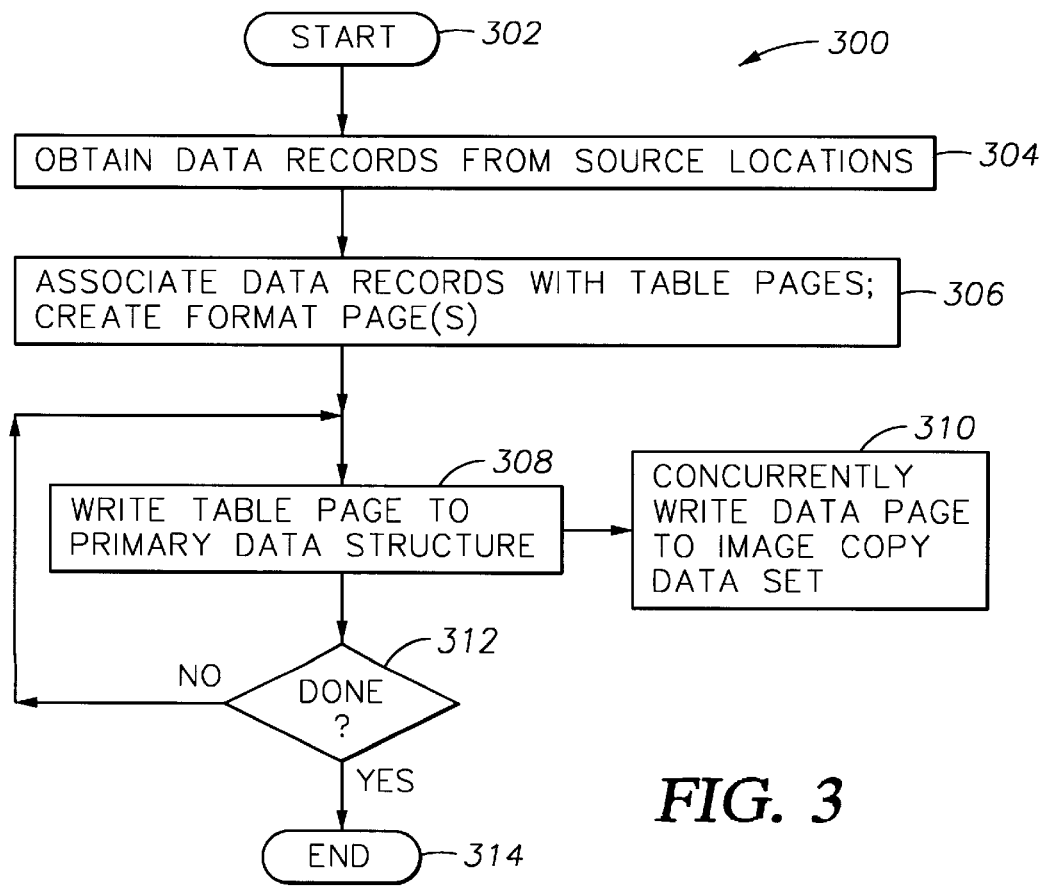
FIG. 3 is a flowchart illustrating a sequence of method steps to concurrently load data into a data structure and store an image cop of the data structure pursuant to the invention.

FIG. 3 shows a sequence of method steps 300 to illustrate one example of the method aspect of the present invention, involving loading a data structure and concurrently creating a full image copy (or "backup copy") For ease of explanation, but without limitation intended thereby, the example of FIG. 3 is described in the context of the database management system 100 as shown in FIG. 1.

After the steps 300 are initiated in task 302, the load processor 104 obtains data records from the source data 112. The source data 112 may be embodied by one or more data storage devices, of various makes and models. Next, the load processor 104 organized the data records into pages in task 306; as these pages contain data from data records, they may be referred to as "data pages". Additional pages may be created in the form of "format pages", which contain information besides raw data, such as "space map" pages, header information, and the like. Task 306's organization of data records into pages may be performed, for example, in the buffer 108.

These data and format pages constitute subcomponents of the primary data structure, which is created in task 308 (discussed below). The primary data structure may comprise a table, an index, or another appropriate data structure made up of subcomponents provided by the data and format pages.

Following task 306, the load processor 104 in task 308 individually writes one page to the primary data structure 114. As each page is written to the primary data structure in task 308, the copy processor 106 writes a copy of the page to the image copy data set 110 in task 310. Task 308 is therefore performed concurrently, which is possible due to the multiprocessing nature of the database manager 102. Accordingly, the image copy created by task 310 may be referred to as an "inline" image copy.

In task 308, the load processor 104 also assigns the current page a timestamp, which is recorded in the data structure as part of the page. The timestamp may comprise a new code or a well known code such as a log sequence number. Accordingly, the image copy page (task 310) is written with the same timestamp as the original page (task 308). As discussed in greater detail below, the timestamps help to distinguish different versions of the same page. After each page is written to the primary data structure in task 308, query 312 asks whether all pages have been written; if not, task 308 is repeated.

Pages in tasks 308/310 are stored as they are created. Therefore, the pages are not necessarily in sequential order, and the same page may be stored multiple times, as shown in Table 2 (below).

TABLE 2

Inline Image Copy page 2
page 1
page 3
page 2
page 4
. . .

Pages may be stored out of order for a number of different reasons. For example, the sequence 300 may sort the data records concurrently with loading the pages. As a result, page 15 may be filled with data before page 5; and accordingly, page 14 would be written to the data structure earlier. For a number of different reasons, the same page may be written to the data structure multiple times. As one example, a partially complete data page may be written to the data structure as part of a prescribed "checkpoint", where data is written to the data structure and its image copy (whether the page is complete or not) to protect against possible future data failure. Space map pages are another reason for possibly writing the same page multiple times. For instance, even though a space map page may be initially written to indicate one state of space availability in the table, the space map page must be rewritten whenever changed or new data pages affect the space availability reported by the space map page. in task 308. Task 310 does not reconfigure the image copy to invalidate older versions of duplicate pages.

When query 312 find that there are no table pages remaining to be loaded to the table, the routine 300 ends in task 314.

Incremental Load/Incremental Image Copy

Using similar techniques as described above, the invention may also be implemented (not shown) to perform an Incremental Load operation and a concurrent Incremental Image Copy operation. An incremental Load operation loads updated and/or new pages to an existing data structure. The Incremental Image Copy operation creates a copy of each page written to the data structure as part of the Incremental Load. Therefore, an incremental image copy data set only represents incrementally loaded pages of a primary data structure.

Restore Using Full Image Copy

Figure 4:
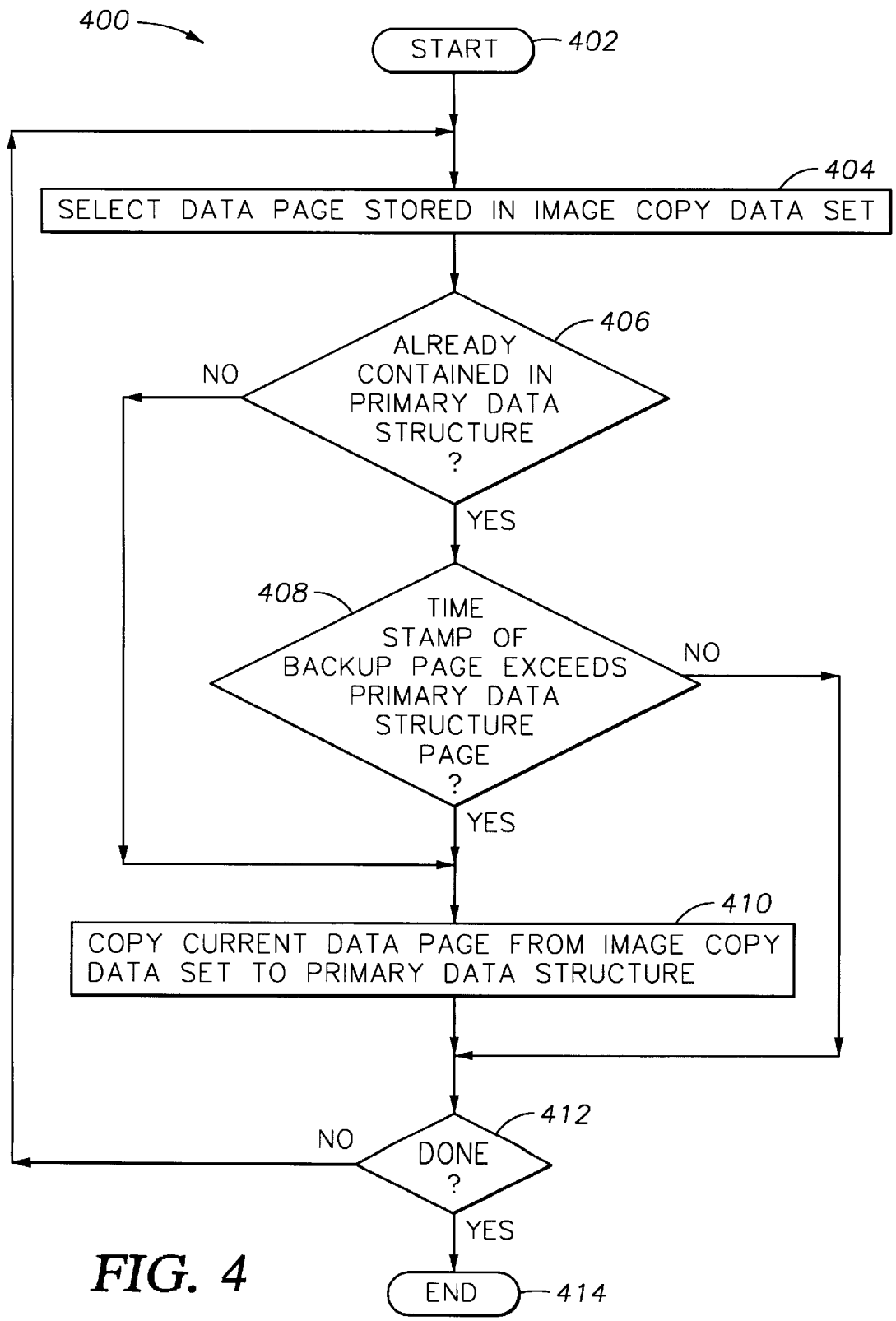
FIG. 4 is a flowchart illustrating a sequence of method steps to recover data table from a full image copy pursuant to the invention.

FIG. 4 shows a sequence of method steps 400 to illustrate a different aspect of the method of the present invention, involving restoration of a data structure from an image copy. For ease of explanation, but without any limitation intended thereby, the example of FIG. 4 is described in the context of the database management system 100 shown in FIG. 1.

The steps may be initiated (task 402) upon detecting partial or complete failure of the primary data structure 114. Generally, the copy processor 106 proceeds thought all pages in the image copy data set, overseeing restoration of the necessary pages to the primary data structure. In particular, the copy processor 106 in task 404 selects one of the data pages stored in the image copy data set. Next, in task 404 the load processor 104 determines whether this page is already contained in the primary data structure; the current page may already be present in the primary data structure because (1) the data structure failure did not affect this page, or (2) this page has already been restored to the primary data structure according to task 410, described below.

If the current page is already contained in the primary data structure, query 408 determined whether the timestamp of the current page (e.g., page 1) exceeds the timestamp of the corresponding page (page 1) on the primary data structure. Query 408 may be performed by either processor 104/106 or a different processor, if desired.

If the current page is newer than the existing page in the primary data structure, the database manager 102 in task 410 copies the current page from the image copy into the primary data structure, superseding the existing copy of that page in the primary data structure. After task 410, or a negative answer to query 408, the copy processor 106 in query 412 determines whether all pages in the image copy data set have been reviewed. If not, another page is examined in task 404. Otherwise, having reviewed all pages in the image copy data set, the routine 400 ends in task 414.

As an alternative to task 408, a record may be made of the highest page yet restored, with timestamps only being compared in task 408 if the page number of the current page is less than or equal to tot the highest page yet restored. Otherwise, if the current page's number is higher than any yet stored, it is being stored anew, so no comparison is needed.

Restore Using Incremental Image Copy

Figure 5:
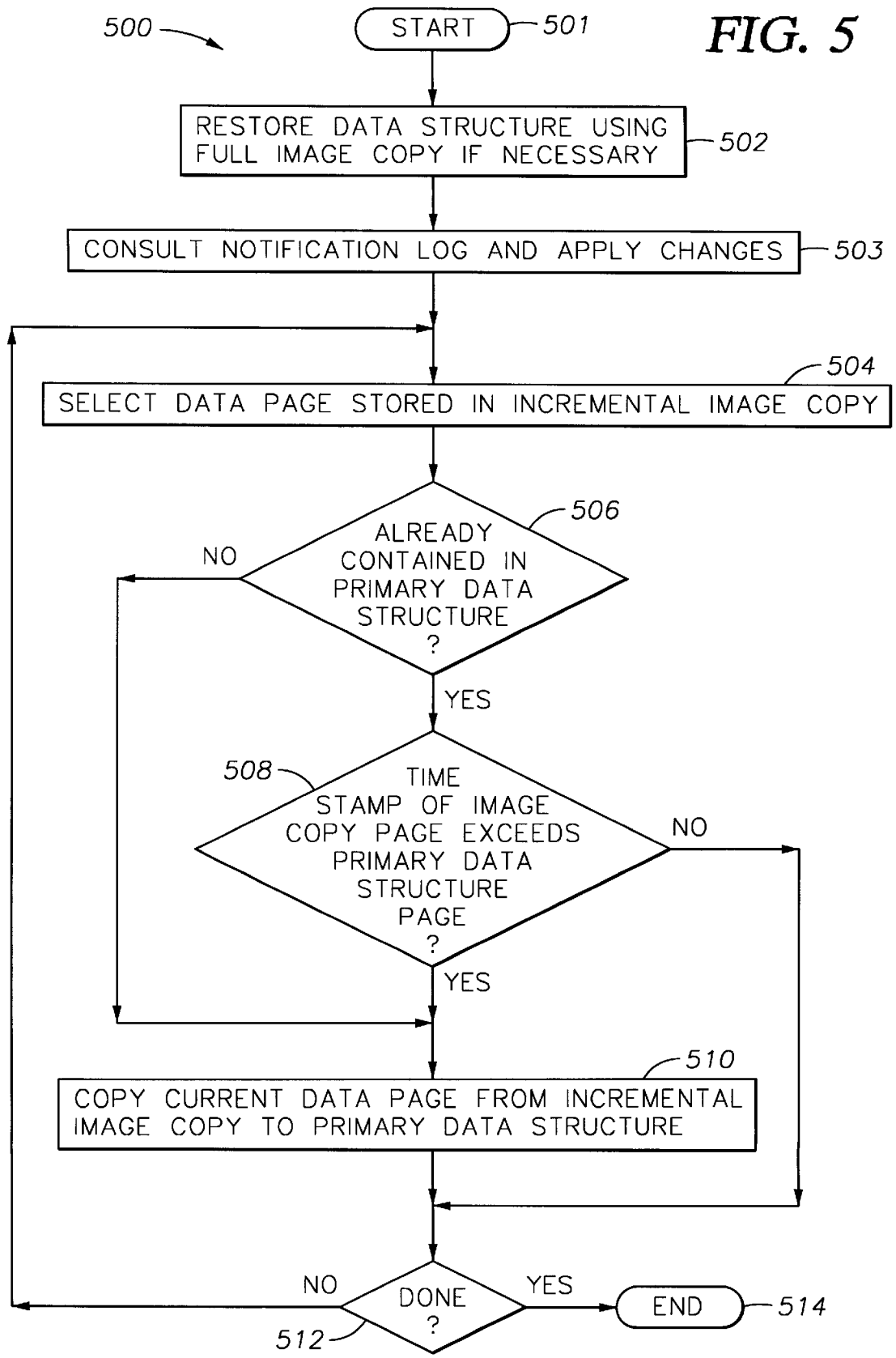
FIG. 5 is a flowchart illustrating a sequence of method steps to recover data from an incremental image copy pursuant to the invention.

FIG. 5 shows a sequence of method steps 500 to illustrate a different aspect of the method of the present invention, where a primary data structure is restored using an incremental image copy. For ease of explanation, but without any limitation intended thereby, the example of FIG. 5 is described in the context of the database management system 100 shown in FIG. 1.

The steps may be initiated (task 501) upon detecting partial or complete failure of the primary data structure 114. First, in task 502 the primary data structure is restored as completely as possible using the most recent full image copy (see FIG. 4). This may not be necessary, however, if the failure of the primary table is limited in scope. The state of the primary data structure after task 502 may be referred to as "semi-restored". After task 502, the database manager 102 consults a log of intermediate modifications (i.e., non-loads) to the semi-restored table in task 503. As is known in the database industry, many systems maintain a record of modifications to a data structure between Load operations, e.g., changes to a table achieved using SQL. In task 503, the database manager 102 re-executes the logged changes to the semi-restored primary data structure, thereby further restoring the table.

After task 503, the copy processor 106 in task 504 selects one of the data pages stored in the incremental image copy. Then, in query 506, the load processor 104 determines whether this page is already contained in the primary data structure; the current page may already be present in the primary data structure because (1) the primary data structure failed did not affect this page, or (2) this page has already been restored to the primary data structure according to tasks 502, 503, or 510 (discussed below).

If the current page is already contained in the primary data structure, query 508 determines whether the timestamp of the current page (e.g., page 1) exceeds the timestamp of the correspondingpage (page 1) in the primary data structure. Query 508 may be performed by either processor 104/106 or a different processor, if desired. If the current page is newer than the existing page in the primary data structure, the database manager 102 in task 510 copies the current page from the image copy into the primary data structure, superseding the existing copy of that page in the primary data structure.

After task 510, or a negative answer to query 508, the copy processor 106 in query 512 determines whether all pages in the image copy have been reviewed. If not, another page is examined in task 504. Otherwise, having reviewed all pages in the image copy, the routine 500 ends in task 514.

Reorganization/Image Copy

According to still another embodiment of the method aspect of the invention, a "Reorganize" operation (not shown) may be performed to reclaim the wasted space and place rows of the primary data structure in proper order, while concurrently creating an inline image copy. This process may be useful because, after a period of user updates to a data structure, it may become "disorganized", i.e., rows with similar keys may be placed far apart, and excessive space may be used. Preferably, the Reorganize operation unloads the data from the primary data structure into an intermediate data set sorts the data as it is unloaded, and the reloads the data into the primary data structure. The second part of the Reorganize operation, that of reloading the data into the table, is similar to the Load/Image Copy operation described previously, and illustrated in FIG. 3, where the unloaded data is the source data 112, and the concurrent reload and image copy creation take place as described previously in tasks 302 through 314.

Other Embodiments

While there have been shown what are presently considered to be preferred embodiments of the invention, it will be apparent to those skilled din the art that various changes and modifications can be made herein without departing from the scope of the invention as defined by the appended claims.

What is claimed is:

1. A method for operating a multiprocessing system to generate a primary data structure while concurrently creating an image copy of the primary data structure, comprising the steps of:

forming a primary data structure by copying a plurality of data records from one or more data sources, associating each of the data records with one of multiple pages, completing each page by satisfying predetermined criteria for the page, and upon completion of each page writing contents of that page to the primary data structure; and for each of multiple pages of the primary data structure being formed, copying the completed page to an image copy data set substantially concurrently with writing of that page to the primary data structure and substantially before completing the formation of the primary data structure.

2. The method of claim 1, the primary data structure including a table.

3. The method of claim 1, the primary data structure including an index.

4. The method of claim 1, the pages including data pages and format pages.

5. The method of claim 4, the predetermined criteria for completing data pages comprising filling the data page by associating a predetermined number of data records with the data page.

6. The method of claim 4, the predetermined criteria for completing format pages comprising accumulation of a predetermined amount of information about the data records and associating the accumulated information with the format page.

7. A method for database management, comprising the steps of:

forming a primary data structure by copying a plurality of data records from one or more data sources, associating each of the data records with one of multiple pages, completing each page by satisfying predetermined criteria for the page, and upon completion of each page writing contents of that page to the primary data structure, each page in the primary data structure being provided with a timestamp representing a time of writing the page to the primary data structure;

for each of multiple pages of the primary data structure being formed, copying the completed page and its timestamp to an image copy data set substantially concurrently with writing of the completed page to the primary data structure and substantially before completing the formation of the primary data structure;

detecting at least a partial failure of the primary data structure; and in response to the failure detection, using the image copy data set to restore the primary data structure by performing steps comprising:

sequentially reviewing each page of the image copy data set; and for each image copy page being reviewed, comparing timestamps of the image copy page and a corresponding page from the primary data structure, and copying the image copy page to the primary data structure if the image copy page's timestamp is more recent than the timestamp of the corresponding page from the primary data structure.

8. The method of claim 7, the primary data structure including a table.

9. The method of claim 7, the primary data structure including an index.

10. The method of claim 7, the timestamps including log sequence numbers.

11. The method of claim 7, the failure being a partial failure of the primary data structure.

12. The method of claim 7, the failure being a complete failure of the primary data structure.

13. A method for database table management, comprising the steps of:

updating an existing data structure by copying a plurality of data records from one or more data sources, associating each of the data records with one of multiple pages, completing each page by satisfying predetermined criteria for the page, and upon completion of each page writing contents of that page to the existing data structure, each page in the existing data structure being provided with a timestamp representing a time of writing the page to the existing data structure;

for each of multiple pages of the existing data structure being updated, copying the page to an incremental image copy data set substantially concurrently with writing of that page to the existing data structure and substantially before completing the update of the existing data structure;

detecting failure of the existing data structure;

in response to the detection of failure, using the incremental image copy data set to restore the existing data structure by performing steps comprising:

sequentially reviewing each page of the incremental image copy data set; and for each page being reviewed, comparing timestamps of the page from the incremental image copy data set and the corresponding page from the existing data structure, and copying the page from the incremental image copy data set to the existing data structure if the incremental image copy page's timestamp is more recent than the timestamp of the corresponding page from the existing data structure.

14. The method of claim 13, the existing data structure including a table.

15. The method of claim 13, the existing data structure including an index.

16. The method of claim 13, the timestamps including log sequence numbers.

17. The method of claim 13, the failure being a partial failure of the existing data structure.

18. The method of claim 17, further comprising steps of, prior to restoring the existing data structure, consulting a modification log and applying modifications listed therein to the partially failed existing data structure.

19. The method of claim 13, the failure being a complete failure of the existing data structure, the method further comprising, prior to restoration of the existing data structure, the steps of:

regenerating an old version of the existing data structure from a previously constructed full image copy data set.

20. The method of claim 19, further comprising steps of, prior to restoration of the existing data structure, consulting a modification log and applying modifications listed therein to the old version of the existing data structure.

21. A method for operating a multiprocessing system to reorganize a primary data structure while concurrently creating an image copy of the primary data structure, comprising the steps of:

forming an unload data set by copying and sorting a plurality of records from a primary data structure;

forming a reorganized data structure by copying data records from the unload data set, associating each of the data records with one of multiple pages, completing each page by satisfying predetermined criteria for each page, and upon completion of each page writing contents of that page to the reorganized data structure; and for each of multiple pages of the reorganized data structure being formed, copying the completed page to an image copy data set substantially concurrently with writing of that page to the reorganized data structure and substantially before completing the formation of the reorganized data structure.

22. The method of claim 21, the primary data structure including a table.

23. The method of claim 21, the primary data structure including an index.

24. An article of manufacture comprising a data storage medium tangibly embodying a program of machine-readable instructions executable by a digital processing apparatus to perform method steps for generating a primary data structure while concurrently creating an image copy of the primary data structure, said method steps comprising:

forming a primary data structure by copying a plurality of data records from one or more data sources, associating each of the data records with one of multiple pages, completing each page by satisfying predetermined criteria for the page, and upon completion of each page writing contents of that page to the primary data structure; and for each of multiple pages of the primary data structure being formed, copying the completed page to an image copy data set substantially concurrently with writing of that page to the primary data structure and substantially before completing the formation of the primary data structure.

25. The article of manufacture of claim 24, the primary data structure including a table.

26. The article of manufacture of claim 24, the primary data structure including an index.

27. The article of manufacture of claim 24, the pages including data pages and format pages.

28. The article of manufacture of claim 27, the predetermined criteria for completing data pages comprising filling the data page by associating a predetermined number of data records with the data page.

29. The article of manufacture of claim 27, the predetermined criteria for completing format pages comprising accumulation of a predetermined amount of information about the data records and associating the accumulated information with the format page.

30. An article of manufacture comprising a data storage medium tangibly embodying a program of machine-readable instructions executable by a digital processing apparatus to perform method steps for database management, said method steps comprising:

forming a primary data structure by copying a plurality of data records from one or more data sources, associating each of the data records with one of multiple pages, completing each page by satisfying predetermined criteria for the page, and upon completion of each page writing contents of that page to the primary data structure, each page in the primary data structure being provided with a timestamp representing a time of writing the page to the primary data structure;

for each of multiple pages of the primary data structure being formed, copying the completed page and its timestamp to an image copy data set substantially concurrently with writing of the completed page to the primary data structure and substantially before completing the formation of the primary data structure;

detecting at least a partial failure of the primary data structure; and in response to the failure detection, using the image copy data set to restore the primary data structure by performing steps comprising:

sequentially reviewing each page of the image copy data set; and for each image copy page being reviewed, comparing timestamps of the image copy page and a corresponding page from the primary data structure, and copying the image copy page to the primary data structure if the image copy page's timestamp is more recent than the timestamp of the corresponding page from the primary data structure.

31. The article of manufacture of claim 30, the primary data structure including a table.

32. The article of manufacture of claim 30, the primary data structure including an index.

33. The article of manufacture of claim 30, the timestamps including log sequence numbers.

34. The article of manufacture of claim 30, the failure being a partial failure of the primary data structure.

35. The article of manufacture of claim 30, the failure being a complete failure of the primary data structure.

36. An article of manufacture comprising a data storage medium tangibly embodying a program of machine-readable instructions executable by a digital processing apparatus to perform method steps for database management, said method steps comprising:

updating an existing data structure by copying a plurality of data records from one or more data sources, associating each of the data records with one of multiple pages, completing each page by satisfying predetermined criteria for the page, and upon completion of each page writing contents of that page to the existing data structure, each page in the existing data structure being provided with a timestamp representing a time of writing the page to the existing data structure;

for each of multiple pages of the existing data structure being updated, copying the page to an incremental image copy data set substantially concurrently with writing of that page to the existing data structure and substantially before completing the update of the existing data structure;

detecting failure of the existing data structure;

in response to the detection of failure, using the incremental image copy data set to restore the existing data structure by performing steps comprising:

sequentially reviewing each page of the incremental image copy data set; and for each page being reviewed, comparing timestamps of the page from the incremental image copy data set and the corresponding page from the existing data structure, and copying the page from the incremental image copy data set to the existing data structure if the incremental image copy page's timestamp is more recent than the timestamp of the corresponding page from the existing data structure.

37. The article of manufacture of claim 36, the existing data structure including a table.

38. The article of manufacture of claim 36, the existing data structure including an index.

39. The article of manufacture of claim 36, the timestamps including log sequence numbers.

40. The article of manufacture of claim 36, the failure being a partial failure of the existing data structure.

41. The article of manufacture of claim 36, further comprising steps of, prior to restoring the existing data structure, consulting a modification log and applying modifications listed therein to the partially failed existing data structure.

42. The article of manufacture of claim 36, the failure being a complete failure of the existing data structure, the method further comprising, prior to restoration of the existing structure, the steps of:

regenerating an old version of the existing date structure from a previously constructed full image copy data set.

43. The article of manufacture of claim 42, further comprising steps of, prior to restoring the existing data structure, consulting a modification log and applying modifications listed therein to the old version of the existing data structure.

44. An article of manufacture comprising a data storage medium tangibly embodying a program of machine-readable instructions executable by a digital processing apparatus to perform method steps for reorganizing a primary data structure while concurrently creating an image copy of the primary data structure, said method steps comprising:

forming an unload data set by copying and sorting a plurality of records from a primary data structure;

forming a reorganized data structure by copying data records from the unload data set, associating each of the data records with one of multiple pages, completing each page by satisfying predetermined criteria for each page, and upon completion of each page writing contents of that page to the reorganized data structure; and for each of multiple pages of the reorganized data structure being formed, copying the completed page to an image copy data set substantially concurrently with writing of that page to the reorganized data structure and substantially before completing the formation of the reorganized data structure.

45. The article of manufacture of claim 44, the primary data structure including a table.

46. The article of manufacture of claim 44, the primary data structure including an index.

47. A multiprocessing system, comprising:

a data storage unit comprising at least one data storage device;

at least one processing unit, coupled to the data storage location and being programmed to perform method steps comprising:

in response to a single load command, forming a primary data structure by copying a plurality of data records from the data storage unit, associating each of the data records with one of multiple pages, completing each page by satisfying predetermined criteria for the page, and upon completion of each page writing contents of that page to the primary data structure in the data storage unit; and for each of multiple pages of the primary data structure being formed, copying the completed page to an image copy data set in the data storage unit substantially concurrently with writing of that page to the primary data structure and substantially before completing the formation of the primary data structure.

48. The system of claim 47, the primary data structure including a table.

49. The system of claim 47, the primary data structure including an index.

50. The system of claim 47, the pages including data pages and format pages.

51. The system of claim 50, the predetermined criteria for completing data pages comprising filling the data page by associating a predetermined number of data records with the data page.

52. The system of claim 50, the predetermined criteria for completing format pages comprising accumulation of a predetermined amount of information about the data records and associating the accumulated information with the format page.

53. A multiprocessing system, comprising:

a data storage unit comprising at least one data storage device; and at least one processing unit, coupled to the data storage unit and being programmed to perform method steps comprising:

in response to a single load command, forming a primary data structure by copying a plurality of data records from the data storage unit, associating each of the data records with one of multiple pages, completing each page by satisfying predetermined criteria for the page, and upon completion of each page writing contents of that page to the primary data structure in the data storage unit, each page in the primary data structure being provided with a timestamp representing a time of writing the page to the primary data structure;

for each of multiple pages of the primary data structure being formed, copying the completed page and its timestamp to an image copy data set in the data storage unit substantially concurrently with writing of the completed page to the primary data structure and substantially before completing the formation of the primary data structure;

detecting at least a partial failure of the primary data structure; and in response to the failure detection, using the image copy data set to restore the primary data structure by performing steps comprising:

sequentially reviewing each page of the image copy data set; and for each image copy page being reviewed, comparing timestamps of the image copy page and a corresponding page from the primary data structure, and copying the image copy page to the primary data structure if the image copy page's timestamp is more recent than the timestamp of the corresponding page from the primary data structure.

54. The system of claim 53, the primary data structure including a table.

55. The system of claim 53, the primary data structure including an index.

56. The system of claim 53, the timestamps including log sequence numbers.

57. The system of claim 53, the failure being a partial failure of the primary data structure.

58. The system of claim 53, the failure being a complete failure of the primary data structure.

59. A multiprocessing system, comprising:

a data storage unit comprising at least one data storage device; and at least one processing unit, coupled to the data storage unit and being programmed to perform method steps comprising:

in response to a single command, updating an existing data structure by copying a plurality of data records from the data storage unit, associating each of the data records with one of multiple pages, completing each page by satisfying predetermined criteria for the page, and upon completion of each page writing contents of that page to the existing data structure in the data storage unit, each page in the existing data structure being provided with a timestamp representing a time of writing the page to the existing data structure;

for each of multiple pages of the existing data structure being updated, copying the page to an incremental image copy data set in the data storage unit substantially concurrently with writing of that page to the existing data structure and substantially before completing the update of the existing data structure;

detecting failure of the existing data structure;

in response to the detection of failure, using the incremental image copy data set to restore the existing data structure by performing steps comprising:

sequentially reviewing each page of the incremental image copy data set; and for each page being reviewed, comparing timestamps of the page from the incremental image copy data set and the corresponding page from the existing data structure, and copying the page from the incremental image copy data set to the existing data structure if the incremental image copy page's timestamp is more recent than the timestamp of the corresponding page from the existing data structure.

60. The system of claim 59, the existing data structure including a table.

61. The system of claim 59, the existing data structure including an index.

62. The system of claim 59, the timestamps including log sequence numbers.

63. The system of claim 59, the failure being a partial failure of the existing data structure.

64. The system of claim 63, further comprising steps of, prior to restoring the existing data structure, consulting a modification log and applying modifications listed therein to the partially failed existing data structure.

65. The system of claim 59, the failure being a complete failure of the existing data structure, the method further comprising, prior to restoration of the existing data structure, the steps of:

regenerating an old version of the existing data structure from a previously constructed full image copy data set.

66. The system of claim 65, further comprising steps of, prior to restoration of the existing data structure, consulting a modification log and applying modifications listed therein to the old version of the existing data structure.

67. A multiprocessing system, comprising:

a data storage unit comprising at least one data storage device; and at least one processing unit, coupled to the data storage unit and being programmed to perform method steps for reorganizing a primary data structure while concurrently creating an image copy of the primary data structure, said method steps comprising:

forming an unload data set by copying and sorting a plurality of records from a primary data structure in the data storage unit;

forming a reorganized primary data structure by copying data records from the unload data set, associating each of the data records with one of multiple pages, completing each page by satisfying predetermined criteria for each page, and upon completion of each page writing contents of that page to the reorganized data structure in the data storage unit; and for each of multiple pages of the reorganized primary data structure being formed, copying the completed page to an image copy data set in the data storage unit substantially concurrently with writing of that page to the reorganized data structure and substantially before completing the formation of the reorganized primary data structure.

68. The system of claim 67, the primary data structure including a table.

69. The system of claim 67, the primary data structure including an index.

* * * * *